Dec. 29, 1953
L. ROSEN
2,663,965
FISHING PLUG
Filed Dec. 8, 1950
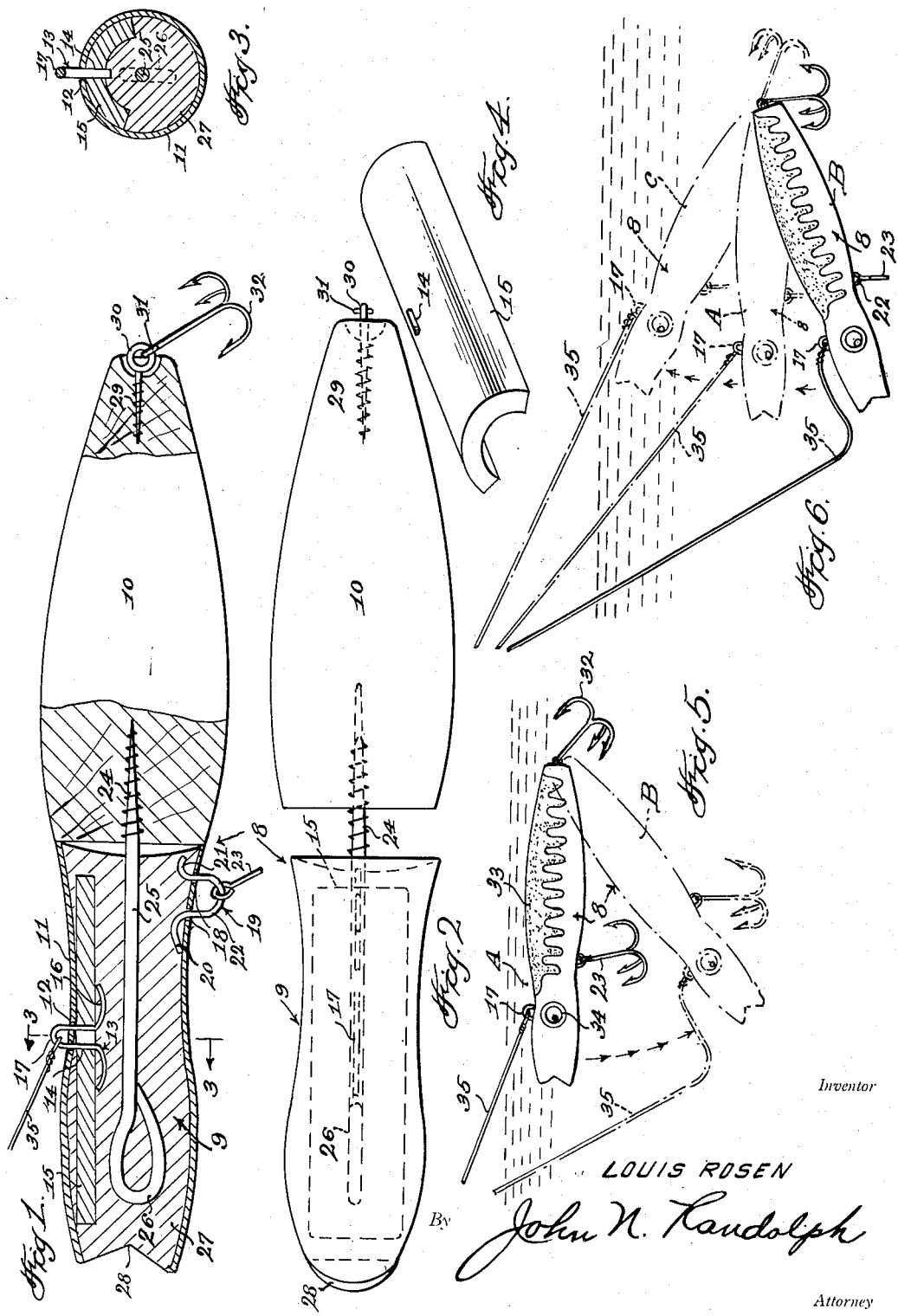
Inventor
LOUIS ROSEN
By John N. Randolph
Attorney Patented Dec. 29, 1953

2,663,965

UNITED STATES PATENT OFFICE 2,663,965

FISHING PLUG

Louis Rosen, Daytona Beach, Fla.

Application December 8, 1950, Serial No. 199,832

2 Claims. (Cl. 43—42.09)

This invention relates to a novel construction of artificial fishing lure or plug and more particularly to a plug of extremely simple construction formed of separable sections whereby one section of the plug may be readily removed and replaced for the substitution of plug sections of different colors or markings to change the overall appearance and color of the plug.

Another and particularly important object of the present invention is to provide a plug including a buoyant end and a non-buoyant end which will enable the plug to be used without a sinker as a sub-surface lure and which will materially affect the movement of the lure in the water for very realistically simulating the swimming motions of a bait fish.

Still a further object of the invention is to provide a lure having a non-buoyant section of novel construction composed of a plurality of parts which are anchored together by a weighted portion of the non-buoyant section and which is so constructed that the top portion of the lure will always remain in an uppermost position while the lure is in the water.

Various other objects and advantages of the invention will hereinafter become more fully apparent from the following description of the drawing, illustrating a presently preferred embodiment thereof, and wherein:

Figure 1 is an enlarged longitudinal sectional view, partly in side elevation showing the lure fully assembled;

Figure 2 is a top plan view thereof showing the lure sections partially assembled;

Figure 3 is a cross sectional view taken through the forward section of the lure substantially along a plane as indicated by the line 3—3 of Figure 1;

Figure 4 is a detail perspective view of one element of the lure;

Figure 5 is a side elevational view showing the lure in an operative position, illustrating two of the positions of the lure in the water, and Figure 6 is a view similar to Figure 5 illustrating three positions that the lure will assume while being fished.

Referring more specifically to the drawing, the novel fishing plug or lure in its entirety is designated generally 8 and broadly includes a head section, designated generally 9, and a tail section designated 10.

The head section 9 is of non-buoyant construction and includes an outer sleeve portion 11 which may be formed of any suitable relatively hard metal such as brass or copper. The sleeve portion 11 in its upper part intermediate of its ends is provided with longitudinally spaced openings 12 through which the legs of a U-shaped strand 13 extend in a direction inwardly of the sleeve 11. Said legs of the strand 13 both extend through an elongated opening 14 of a bar 15 which is disposed within the sleeve and longitudinally thereof. The bar 15 is of arcuate cross section, as best illustrated in Figures 3 and 4, to substantially conform to the cross sectional contour of the upper portion of the sleeve 11 in which said bar is disposed. The terminals 16 of the legs of the U-shaped strand 13 are bent outwardly and bear against the inner, concave side of the bar 15 for anchoring the strand 13 to the head 9 and for connecting the bar 15 to the sleeve 11. The intermediate portion 17 of the strand 13 projects outwardly from the upper portion of the sleeve 11, intermediate of the ends of the head 9, to provide a line or leader engaging eye or loop. The sleeve 11 is provided with longitudinally spaced openings 18 in its underside and adjacent its trailing end through which the legs of a U-shaped strand of metal 19 extend inwardly of the sleeve 11. The terminals 20 and 21 of said legs are bent outwardly and curved back toward the inner side of the sleeve 11 and the intermediate portions 22 of the strand 19 form a hook supporting loop or eye which projects outwardly from the bottom portion of the head 9. Before the strand 19 is engaged with the sleeve 11 the eye at the shank end of a multi-barbed hook 23 is engaged with the loop portion 22. An outwardly tapered wood screw 24 extends from the rear trailing end of the sleeve 11 and is disposed substantially axially thereof. The wood screw 24 is provided with an elongated shank 25 which extends from the rear end to a point adjacent the forward end of the sleeve 11 and which is provided with a loop 26 forming the forward end thereof.

With the parts 15, 13 and 19 connected to the sleeve 11, as previously described, and with the portions 25 and 26 of the screw 24 disposed within the sleeve 11, as illustrated in Figure 1, the sleeve 11 is filled with molten lead 27. Accordingly, the parts previously referred to are securely anchored in the sleeve 11 by hardening of the lead 27 and combine with the lead and sleeve to form the non-buoyant head 9. The forward end of the head 9 is provided with a recessed face 28 formed by a downwardly and forwardly inclined bottom surface and upwardly and forwardly inclined upper surface formed in the forward end of the lead 27 and in the forward end of the sleeve 11.

The trailing end or tail section 10 of the lure 8 is formed of a buoyant material, preferably wood, of substantially circular cross section which is tapered slightly in diameter from a point near its forward end to the forward end thereof and from near its forward end to its rear trailing end. The trailing end of the buoyant tail section 10 is substantially smaller in cross section than the forward end thereof and said forward end is of substantially the same cross sectional size and shape as the rear end of the head 9. The lure 8 may vary in shape but the adjacent ends of the sections 9 and 10 when in abutting engagement, as illustrated in Figures 1, 5 and 6 preferably provide a smooth substantially uninterrupted surface and the head section 9 may taper in diameter from its trailing end to a point intermediate of its ends to form a continuation of the tapered forward portion of the tail section 10 and may be slightly enlarged therebeyond and of an irregular exterior shape adjacent its forward end to more realistically simulate the head of a bait fish. The wood screw 24 is screwed axially into the tail section 10 from its forward end toward its rear end to detachably connect the tail section 10 to the head section 9 in abutting end-to-end relationship as illustrated in Figure 1. A wood screw 29 is driven longitudinally into the restricted rear end of the tail section 10 to support an eye 30 formed integral therewith which projects from the rear end of the section 10. An eye 31 on the shank end of a multi-barbed hook 32 is connected to the eye 30 for swingably supporting the hook 32 at the trailing end of the lure 8. The hook 23 is likewise swingably supported beneath the intermediate portion of the lure by engagement of its eye with the loop 22. The tail section 10 may be formed of other buoyant material if desired into which the wood screw 24 can be driven or which may be provided with a threaded recess to receive the wood screw.

The upper portion of the lure 8 from behind and adjacent the upstanding loop 17 is preferably suitably inscribed or marked, as indicated at 33 to simulate a particular species of bait fish and which marking 33 may be varied as desired. The tail portion 10 is likewise suitably colored for attracting fish and corresponding tail sections 10 of different colors, which may be either solid or variegated, may be interchangeably employed. The head 9 may also be suitably colored to blend with the tail section 10 of different colors or may be left the natural color of the sleeve 11. Opposite sides of the exterior of the head 9 are suitably marked or inscribed to simulate eyes, one of which is shown at 34.

A fishing line or leader 35 has one end secured to the eye or loop 17. As the line or leader 35 is connected to the top portion of the head of the lure and intermediate of the ends of the head section 9, the lure will assume substantially its full line position of Figure 5, designated A, when being drawn through the water by the line or leader 35 when the lure is either being trolled or retrieved. If the line 35 is slacked off, as illustrated in dotted lines in Figure 5, the lure will assume the dotted line position B with the head and tail sections 9 and 10 respectively inclined downwardly due to the fact that the tail section is buoyant while the head section is non-buoyant. Even with the line 35 slacked off, the upper portion of the lure will remain in an uppermost position due to the fact that the bar 15 is formed of a lighter weight metal than the lead 27 so that the upper portion of the head 9 is lighter than the lower portion thereof. The bar 15 is preferably formed of aluminum. Likewise, with the lure inclined downwardly as seen in full lines in Figure 6 in its position designated B, when a pull is exerted on the line or leaded 35 the head portion 9 will swing upwardly to its substantially horizontal position A and therebeyond to its dotted line position C wherein the lure 8 is inclined downwardly and rearwardly from its head to its tail. However, as soon as the line is again slacked off the lure will swing back to its position B. Thus, by intermittently pulling on the line or leader 35 the lure 8 may be caused to swing back and forth between its positions A, B and C and in so moving the barbed hooks 23 and 32 will swing on the loop 19 and eye 30, respectively, longitudinally of the lure 8 and this movement together with the up and down and rocking movement of the lure body will very realistically simulate the movements of a live bait fish in the water.

Various modifications and changes are contemplated and may obviously be resorted to, without departing from the spirit or scope of the invention as hereinafter defined by the appended claims.

I claim as my invention:

1. An artificial fishing lure or plug comprising an elongated lure body formed of a head section and a tail section, fastening means detachably connecting said lure body sections in end-to-end relationship, said head section being formed of a non-buoyant material and said tail section being formed of a buoyant material, said head section comprising an elongated metal sleeve, lead filling a substantial part of the hollow interior of said sleeve for weighting the head section, said head section including an upper portion and a lower portion, and an elongated bar of a relatively light weight metal disposed in the upper portion of the sleeve for lightening the weight of the upper part of the head portion relatively to the lower part thereof.

2. An artificial fishing lure or plug comprising an elongated lure body formed of a head section and a tail section, fastening means detachably connecting said lure body sections in end-to-end relationship, said head section being formed of a non-buoyant material, and said tail section being formed of a buoyant material, said head section comprising an elongated metal sleeve, lead filling a substantial part of the hollow interior of said sleeve for weighting the head section, said head section including an upper portion and a lower portion, an elongated bar of a relatively light weight metal disposed in the upper portion of the sleeve for lightening the weight of the upper part of the head portion relatively to the lower part thereof, and a fishing line engaging loop projecting from the upper portion of the head section, said loop being formed from a strand of wire having leg portions extending inwardly through the upper portion of the sleeve and through said bar, the terminal portions of said legs being turned outwardly against the inner surface of the bar for connecting the bar to the sleeve and being imbedded in the lead for anchoring the loop to the head portion of the lure.

LOUIS ROSEN.

References Cited in the file of this patent

UNITED STATES PATENTS

| Number | Name | Date |
|---|---|---|
| 769,356 | Reis | Sept. 6, 1904 |
| 857,883 | Dreisser | June 25, 1907 |
| 1,068,409 | Chester | July 29, 1913 |
| 1,233,507 | Reynolds | July 17, 1917 |
| 1,636,832 | Pagin | July 26, 1927 |
| 1,740,335 | Cowan | Dec. 17, 1929 |
| 1,836,650 | Davenport | Dec. 15, 1931 |
| 1,865,359 | Eger | June 28, 1932 |
| 2,184,031 | Wyatt | Dec. 19, 1939 |
| 2,382,595 | Wood | Aug. 14, 1945 |
| 2,479,675 | Findlay | Aug. 23, 1949 |
| 2,498,800 | Fehely | Feb. 28, 1950 |